United States Patent
Chang et al.

(10) Patent No.: US 9,203,076 B2
(45) Date of Patent: Dec. 1, 2015

(54) ELECTRODE FOR LITHIUM SECONDARY BATTERY, METHOD OF MANUFACTURING THE SAME, AND LITHIUM SECONDARY BATTERY INCLUDING THE SAME

(71) Applicant: Samsung SDI Co., Ltd., Yongin-si, Gyeonggi-do (KR)

(72) Inventors: Bum-Jin Chang, Yongin-si (KR); Woon-Suk Jang, Yongin-si (KR); Chae-Woong Cho, Yongin-si (KR); Seung-Hun Han, Yongin-si (KR); Ki-Jun Kim, Yongin-si (KR); Kwi-Seok Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/098,340

(22) Filed: Dec. 5, 2013

(65) Prior Publication Data
US 2014/0093772 A1    Apr. 3, 2014

Related U.S. Application Data

(62) Division of application No. 13/540,160, filed on Jul. 2, 2012.

(30) Foreign Application Priority Data

Jul. 7, 2011   (KR) .......................... 10-2011-0067532

(51) Int. Cl.
*H01M 4/04* (2006.01)
*H01M 4/13* (2010.01)
(Continued)

(52) U.S. Cl.
CPC .............. *H01M 4/0404* (2013.01); *H01M 4/13* (2013.01); *H01M 4/131* (2013.01); *H01M 4/136* (2013.01); *H01M 4/1397* (2013.01); *H01M 4/602* (2013.01); *H01M 4/62* (2013.01); *H01M 4/622* (2013.01); *H01M 4/623* (2013.01); *H01M 10/02* (2013.01); *H01M 10/052* (2013.01); *H01M 4/64* (2013.01); *H01M 10/056* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2002/0006552 A1 | 1/2002 | Ishida et al. | |
| 2004/0126667 A1* | 7/2004 | Sandi-Tapia et al. | 429/317 |

(Continued)

FOREIGN PATENT DOCUMENTS

| | | |
|---|---|---|
| JP | 8-279354 A | 10/1996 |
| JP | 2008-41502 A | 2/2008 |

(Continued)

OTHER PUBLICATIONS

Extended European Search Report issued by the European Patent Office dated Nov. 5, 2012, 5 pages.

(Continued)

*Primary Examiner* — Miriam Stagg
*Assistant Examiner* — Carmen Lyles-Irving
(74) *Attorney, Agent, or Firm* — Knobbe Martens Olson & Bear LLP (57) ABSTRACT

An electrode for a lithium secondary battery, the electrode including: an electrode active material; and a composite including a clay and a polymer intercalated between layers of the clay, a method of manufacturing the electrode, and a lithium secondary battery including the electrode.

5 Claims, 6 Drawing Sheets

(51) Int. Cl.
  *H01M 4/131* (2010.01)
  *H01M 4/60* (2006.01)
  *H01M 4/62* (2006.01)
  *H01M 10/02* (2006.01)
  *H01M 10/052* (2010.01)
  *H01M 4/136* (2010.01)
  *H01M 4/1397* (2010.01)
  *H01M 10/056* (2010.01)
  *H01M 4/64* (2006.01)

(56) References Cited

U.S. PATENT DOCUMENTS

| | | |
|---|---|---|
| 2006/0194117 A1 | 8/2006 | Paulsen |
| 2008/0063939 A1 | 3/2008 | Ryu et al. |
| 2008/0160415 A1 | 7/2008 | Wakita et al. |
| 2010/0035148 A1 | 2/2010 | Wakita et al. |
| 2010/0279175 A1 | 11/2010 | Young |
| 2011/0012057 A1* | 1/2011 | Lindner et al. ............. 252/194 |

FOREIGN PATENT DOCUMENTS

| | | |
|---|---|---|
| JP | 2008-204753 A | 9/2008 |
| JP | 2009-129668 A | 6/2009 |
| WO | WO 01/29915 A2 | 4/2001 |
| WO | WO 2005/068551 A1 | 7/2005 |

OTHER PUBLICATIONS

Office Action issued in corresponding Chinese Application No. 201210230595.0 dated Jun. 8, 2015.

* cited by examiner

ELECTRODE FOR LITHIUM SECONDARY BATTERY, METHOD OF MANUFACTURING THE SAME, AND LITHIUM SECONDARY BATTERY INCLUDING THE SAME

CROSS-REFERENCE TO RELATED APPLICATIONS

This application is a divisional application of and claims priority to U.S. patent application Ser. No. 13/540,160, filed Jul. 2, 2012 which claims the benefit of Korean Patent Application No. 10-2011-0067532, filed on Jul. 7, 2011, in the Korean Intellectual Property Office, the disclosures of both of which are incorporated herein in their entirety by reference.

BACKGROUND

1. Field

One or more embodiments relate to an electrode for a lithium secondary battery, a method of manufacturing the same, and a lithium secondary battery including the electrode.

2. Description of the Related Technology

A lithium secondary battery consists of a positive electrode, a negative electrode, a separator, and an electrolyte. During charging, lithium ions are deintercalated from the positive electrode and migrate toward the negative electrode, and during discharging, lithium ions are deintercalated from the negative electrode and return to the positive electrode. The positive and negative electrodes and the electrolyte do not induce any chemical reactions.

Typically, an electrode includes a mixture including an active material for storing energy, a conducting agent for supplying electric conductivity, and a binder. In general, as an active material for the positive electrode, a lithium transition metal oxide is used, and as an active material for the negative electrode, a carbonaceous active material is used. To manufacture the electrode, the mixture is mixed with a solvent to prepare a slurry, and then the slurry is coated and dried on a current collector. In this case, the binder improves dispersion of the conducting agent, an adhesive force between active material particles, between the active material and the current collector, and between the active material and the conducting agent, and conductivity of the conducting agent.

As the binder, a fluorine-based polymer material that is insoluble with respect to an organic electrolytic solution and is chemically stable, such as polyvinylidene fluoride (PVdF), is widely used.

However, if the fluorine-based polymer material, such as PVdF, is used as the binder, since chains of the fluorine-based polymer material are entangled, the binder has a high swelling ratio that indicates a degree to which the binder swells when the electrolytic solution permeates thereinto. Also, due to the interaction between the chains, when a nano-sized active material and the conducting agent are used, the solvent may separately leak out. Also, the swollen binder leads to an increase in a distance between active material particles, thereby increasing resistance of an electrode including the binder.

SUMMARY

One or more embodiments include an electrode for a lithium secondary battery in which polymer chains are less entangled and which swells less with respect to an electrolytic solution, a method of manufacturing the same, and a lithium secondary battery including the electrode.

Additional aspects will be set forth in part in the description which follows and, in part, will be apparent from the description, or may be learned by practice of the presented embodiments.

According to one or more embodiments, an electrode for a lithium secondary battery, includes: an electrode active material; and a composite including a clay and a polymer intercalated between layers of the clay.

According to one or more embodiments, a method of manufacturing an electrode for a lithium secondary battery includes: preparing a clay dispersion by dispersing clay in a first solvent; preparing a composite by mixing the clay dispersion with a polymer or a polymer solution prepared by dissolving the polymer in a second solvent: preparing a composition for forming an electrode active material layer by adding an electrode active material to the composite and mixing the electrode active material and the composite; and coating and drying the composition on a current collector to form an electrode active material layer.

According to one or more embodiments, a method of manufacturing an electrode for a lithium secondary battery includes: melting clay and a polymer by using a heat treatment; extruding the molten product to form a composite; preparing a composition for forming an electrode active material layer by dissolving the composite in a third solvent, adding an electrode active material thereto, and mixing the resultant mixture; and coating and drying the composition on a current collector to form an electrode active material layer.

According to one or more embodiments, a lithium secondary battery includes the electrode.

The electrode may be a positive electrode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

An electrode according to an embodiment includes an electrode active material and a composite including a clay and a polymer intercalated between layers of the clay.

The electrode may include a conducting agent.

The electrode may be a positive electrode.

Figure 1:
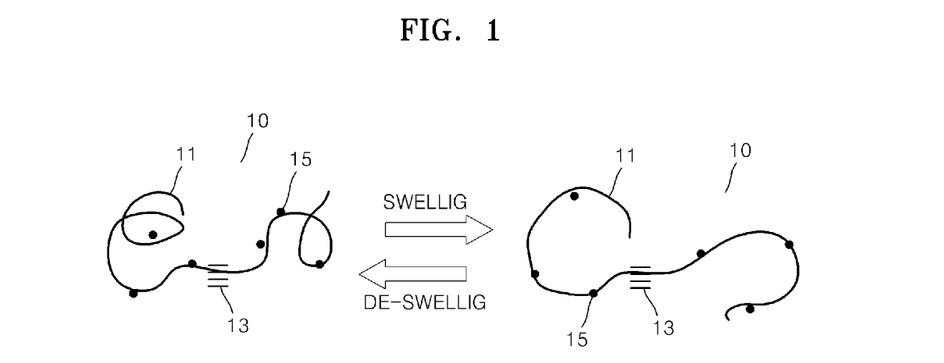
FIG. 1 is a conceptual view of a composite included in an electrode for a lithium secondary battery, according to an embodiment.

FIG. 1 is a conceptual view of a composite 10 included in an active material layer included in an electrode for a lithium secondary battery, according to an embodiment, before and after swelling of the composite 10.

Referring to FIG. 1, the composite 10 includes a polymer 11 and a clay 13, and the polymer 11 is intercalated between layers of the clay 13.

In FIG. 1, the polymer 11 is introduced to a conducting agent 15.

The clay 13 has a layered structure. In this regard, an interlayer distance of the clay 13 may be from about 1 to about 10 nm. If the interlayer distance is within this range, the polymer may be easily intercalated between layers of the clay 13.

Since the polymer 11 is present between layers of the clay 13 having a restricted distance, chains of the polymer 11 present between the layers of the clay 13 are not entangled, and thus, all chains of the polymer are less entangled. If an electrolytic solution permeates into the composite 10 when the chains of the polymer 11 are entangled, the polymer 11 swells more due to adjacent chains of the polymer 11. However, if an electrolytic solution permeates into the composite 10 when the chains of the polymer 11 are not entangled, since the number of adjacent chains of the polymer 11 is relatively decreased, a swelling degree of the polymer 11 is decreased compared to when the polymer 11 is not intercalated between layers of the clay 13. Accordingly, even when the electrolytic solution permeates into the composite 10, a swelling degree of an electrode mixture remains at a moderate level.

The term "electrode mixture" refers to a mixture including the electrode active material and the composite. If an electrode includes a conducting agent, the term "electrode mixture" refers to a mixture including the electrode active material, the composite, and the conducting agent.

A swelling ratio of the electrode mixture may be from about 1 to about 8%.

The swelling ratio of the electrode mixture is measured as follows: a formation capacity evaluation is performed on a battery, the battery is dissembled, and then the electrolytic solution is removed from the battery and a thickness of an electrode plate is measured.

During the permeation of the electrolytic solution, the swelling ratio of the polymer 11 is reduced and thus, in the composite used as the binder, a distance between active material particles is not increased, thereby preventing an increase in resistance of the electrode.

The resistance of the electrode including the composite is from about 5 to about 30% lower than that of an electrode that is generally used.

Hereinafter, an electrode according to another embodiment will be described in detail. First, materials that are used in the electrode mixture will be described in detail.

Examples of the electrode active material are a LFP-based material such as lithium iron phosphate ($LiFePO_4$), a LCO-based material such as lithium cobalt oxide ($LiCoO_2$), a LMO-based material such as lithium manganese oxide ($LiMnO_2$), a LNO-based material such as lithium nickel oxide ($LiNiO_2$), an NCM-based material such as lithium nickel cobalt manganese oxide ($LiNiCoMnO_2$), and a mixture thereof. However, the electrode active material is not limited to the materials described above.

The clay may include at least one selected from the group consisting of montmorillonite, bentonite, saponite, beidellite, nontronite, hectorite, and stevensite.

The polymer may include at least one selected from the group consisting of polyvinylidene fluoride (PVDF), polyvinyl alcohol (PVA), and polyacrylic acid (PAA). A weight average molecular weight of the polymer is from about 100,000 to about 1,000,000.

Substituents of the polymers may enhance an adhesive force with respect to a substrate.

An amount of the composite may be from about 0.1 to about 20 parts by weight, for example, about 0.2 to about 1 part by weight, based on 100 parts by weight of the electrode active material. If the amount of the composite is within the ranges described above, the swelling of the electrode mixture is suppressed without an increase in resistance of the electrode and thus, the formed electrode has excellent conductivity and mechanical characteristics.

The electrode may further include a conducting agent.

As the conducting agent, a carbonaceous material may be used. An example of the carbonaceous material is vapor grown carbon fiber (VGCF), acetylene black, carbon nanotube (CNT), or the like An amount of the conducting agent may be from about 1 to about 10 parts by weight based on 100 parts by weight of the electrode active material. As described above, although the amount of the conducting agent is smaller than a level that is generally used in the art, the formed electrode has excellent conductivity.

A method of manufacturing an electrode for a lithium secondary battery, according to an embodiment, will now be described in detail.

A composite in which a polymer is intercalated in clay is prepared by solution intercalation.

First, clay is dispersed in a first solvent at a temperature of about 40 to about 60° C. to prepare a clay dispersion. An example of the first solvent is N-methylpyrrolidone (NMP).

An amount of the first solvent is from about 5000 to about 10000 parts by weight based on 100 parts by weight of the clay.

A polymer or a polymer solution is added to the clay dispersion and then mixed.

The polymer solution is prepared by dissolving the polymer in a second solvent.

The second solvent may be the same as the first solvent, and an amount of the second solvent may be from about 5000 to about 10000 parts by weight based on 100 parts by weight of the clay. If the amount of the second solvent is within the range described above, the polymer may be homogeneously dissolved in the second solvent.

The polymer solution is added to the clay dispersion and then stirred, thereby completing the preparation of a composite composition in which the polymer is intercalated between layers of the clay.

A conducting agent and an electrode active material are added to the composite composition to prepare a composition for forming an electrode active material layer.

The composition for forming an electrode active material layer is coated and dried on a current collector to form an electrode active material layer on a current collector.

The drying may be performed at a temperature of about 80 to about 160° C.

A method of manufacturing an electrode for a lithium secondary battery, according to another embodiment, will now be described in detail.

A composite in which a polymer is intercalated in layers of clay is prepared by melt intercalation.

A polymer and clay are melted together by using a heat treatment and then extruded to prepare a composite. Due to a rotary force or a sheer force generated during the extrusion, the polymer is intercalated between layers of the clay in the composite.

The heat treatment temperature may be from about 175 to about 200° C. If the heat treatment temperature is within the range described above, the composite may have excellent flow characteristics.

The composite is dissolved in a third solvent to prepare a composite solution in which the polymer is intercalated between layers of the clay.

The third solvent may be, for example, N-methylpyrrolidone (NMP), and an amount thereof may be from about 5000 to about 10000 parts by weight based on 100 parts by weight of the composite.

If the amount of the third solvent is within the range described above, a composite solution of which constituents are homogeneously dissolved may be obtained.

A conducting agent and an electrode active material are added to the composite solution to prepare a composition for forming an electrode active material layer.

The composition for forming an electrode active material layer is coated and dried on a current collector to form an electrode active material layer on the current collector, thereby completing the manufacture of the electrode.

The drying may be performed at a temperature of about 50 to about 150° C.

In the method of manufacturing the electrode, an amount of the polymer may be from about 5 to about 2000 parts by weight, for example, about 500 to about 2000 parts by weight, based on 100 parts by weight of the clay.

If an amount of the polymer is within the range described above, the prepared composite is stable.

According to the methods of manufacturing an electrode according to the above embodiments, due to the use of the composite, a solid content in a composition for forming an electrode active material layer may be increased by about 1 to about 10% compared to a binder that is generally used in the art.

Figure 2:
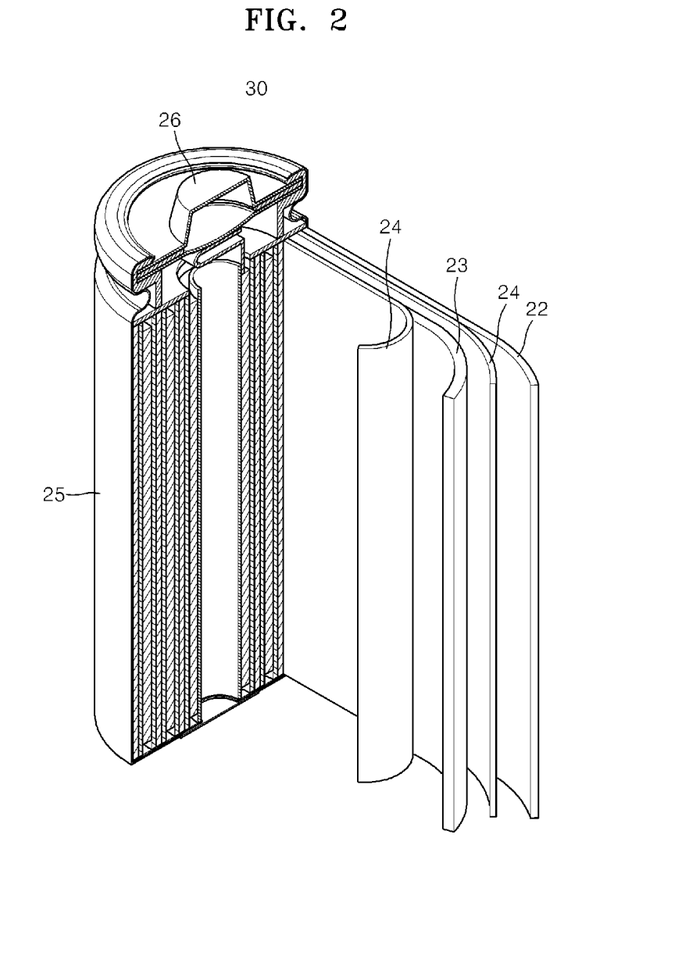
FIG. 2 is a schematic view of a lithium ion battery according to an embodiment.

FIG. 2 is a schematic view of a lithium ion battery according to an embodiment.

Referring to FIG. 2, the lithium secondary battery 30 basically includes a positive electrode 23, a negative electrode 22, a separator 24 disposed between the positive electrode 23 and the negative electrode 22, an electrolytic solution (not shown) with which the positive electrode 23, the negative electrode 22, and the separator 24 are impregnated, a battery case 25, and a sealing member 26 for sealing the battery case 25. The lithium secondary battery 30 may be assembled by depositing the positive electrode 23, the negative electrode 22, and the separator 24, rolling the deposited structure, and placing the rolled deposited structure in the battery case 25. In this regard, the positive electrode 23 includes a composite including a polymer intercalated between layers of clay.

Hereinafter, one or more embodiments will be described in detail. However, the present embodiments are not limited to the one or more embodiments.

Example 1

Manufacture of Lithium Battery

First, 0.5 g of bentonite as clay was dispersed in 50 g of NMP as a solvent at a temperature of about 50° C. to prepare a clay dispersion.

100 g of a polymer solution was added to the clay dispersion and then stirred to complete the preparation of a composite.

The polymer solution was prepared by dissolving 10 g of polyvinylidene fluoride as a polymer in 10 g of NMP as a solvent.

Lithium iron phosphate ($LiFePO_4$) as a positive electrode active material and acetylene black as a conducting agent were mixed with the composite as a binder at a weight ratio of 92:4:4 to prepare a slurry for forming a positive electrode plate active material layer.

The slurry was uniformly coated on an aluminum foil, and dried at a temperature of 110° C., and pressed by using a roll press, thereby forming a positive electrode plate.

A 2032-standard coin cell was manufactured using an electrolytic solution in which 1.3M $LiPF_6$ was dissolved in a mixed solvent including ethylene carbonate:ethymethylene carbonate:dimethyl carbonate=3:4:3 (volumetric ratio) by placing a solid electrolyte between the positive electrode plate and a reference electrode including metallic lithium.

Comparative Example 1

Manufacture of Lithium Battery

A coin cell was manufactured in the same manner as in Example 1, except that polyvinylidene fluoride (PVdF) was used instead of the composite in manufacturing the positive electrode plate.

Comparative Example 2

Manufacture of Lithium Battery

A coin cell was manufactured in the same manner as in Example 1, except that a mixture including 0.5 g of clay bentonite and 10 g of PVDF was used instead of the composite in manufacturing the positive electrode plate.

Evaluation Example 1

Impedance Measurement

Changes in impedance of the coin cells manufactured according to Example 1 and Comparative Example 1 were evaluated.

Figure 3:
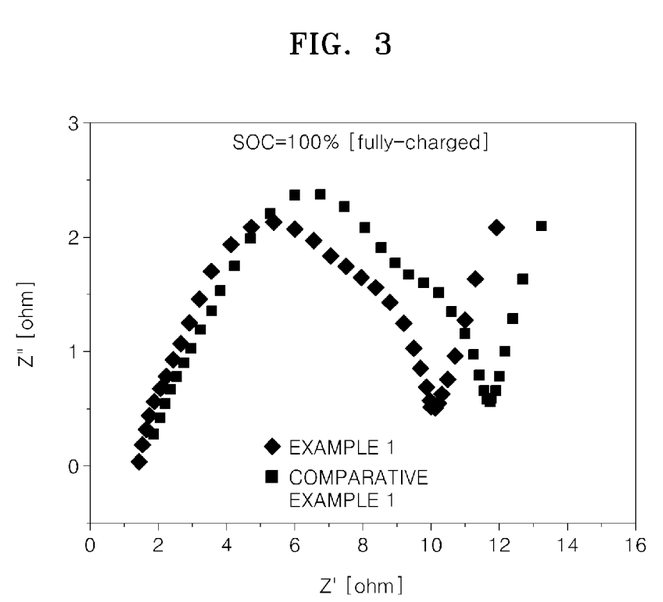
FIGS. 3 and 4 show changes in impedance when lithium batteries manufactured according to Example 1 and Comparative Example 1 are charged and discharged, respectively.
Figure 4:
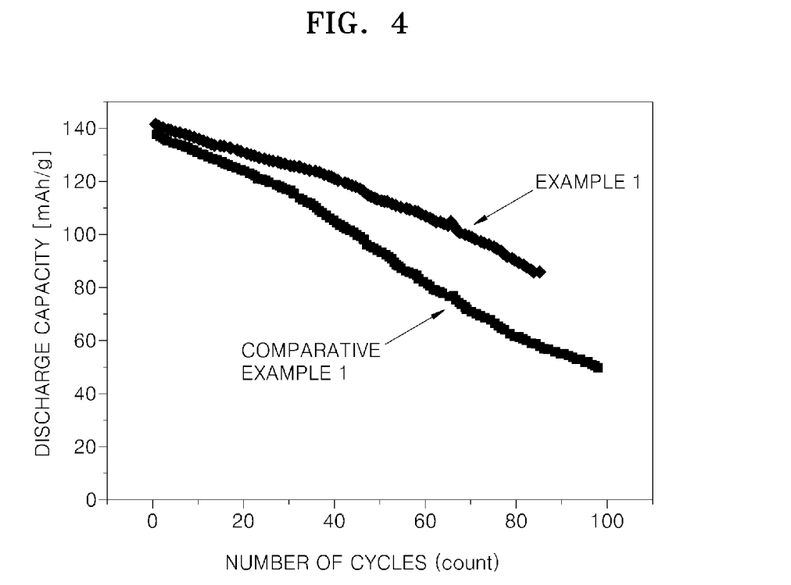

Changes in impedance of the coin cells manufactured according to Example 1 and Comparative Example 1 during charging and discharging are shown in FIGS. 3 and 4, respectively.

Referring to FIGS. 3 and 4, it is confirmed that the coin cell manufactured according to Example 1 has a lower resistance than the coin cell manufactured according to Comparative Example 1. The decrease in resistance may be achieved by controlling distances between electrode active material particles to an appropriate level due to the decrease in swelling of the composite as the binder.

Evaluation Example 2

High-Rate Charge and Discharge Test

Figure 5:
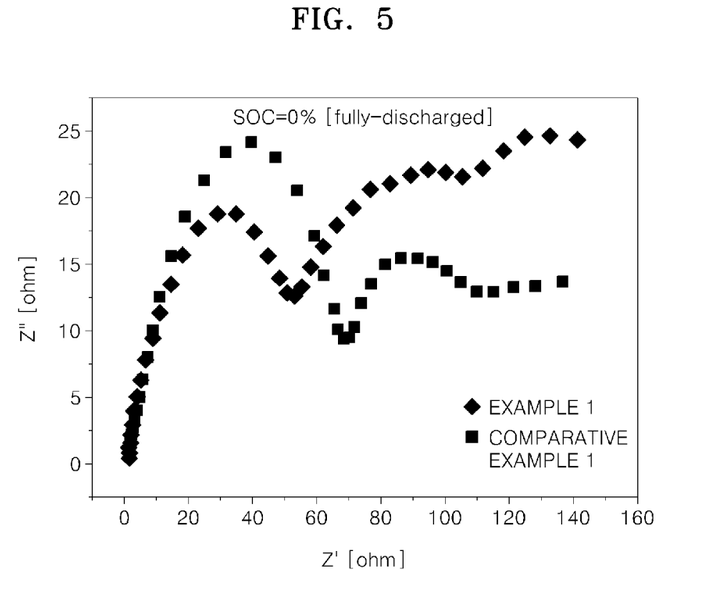
FIG. 5 is a graph of discharge capacities of coin cells manufactured according to Example 1 and Comparative Example 1.

The coin cells manufactured according to Example 1 and Comparative Example 1 were charged with a constant current of 0.1 C rate within a voltage range of about 2.5 to about 4.1 V with respect to metallic lithium at room temperature, and a discharge capacity with respect to a current density during the charging is shown in FIG. 5. Also, measured current densities during discharging were 0.1 C, 0.2 C, 0.5 C, and 1 C rates.

Referring to FIG. 5, the coin cell manufactured according to Example 1 shows substantially improved high-rate characteristics compared to the coin cell manufactured according to Comparative Example 1.

Evaluation Example 3

Lifetime Characteristics Test

The coin cells manufactured according to Example 1 and Comparative Example 1 were charged and discharged with a constant current of 1 C rate within a voltage range of about 2.5 to about 4.1 V with respect to metallic lithium at room temperature up to a $50^{th}$ cycle, and at a $100^{th}$ cycle, the coin cells were then charged and discharged with a constant current of 1 C rate. In this regard, a discharge capacity of the coin cells was measured in the respective cases and results thereof are shown in FIG. 6.

Figure 6:
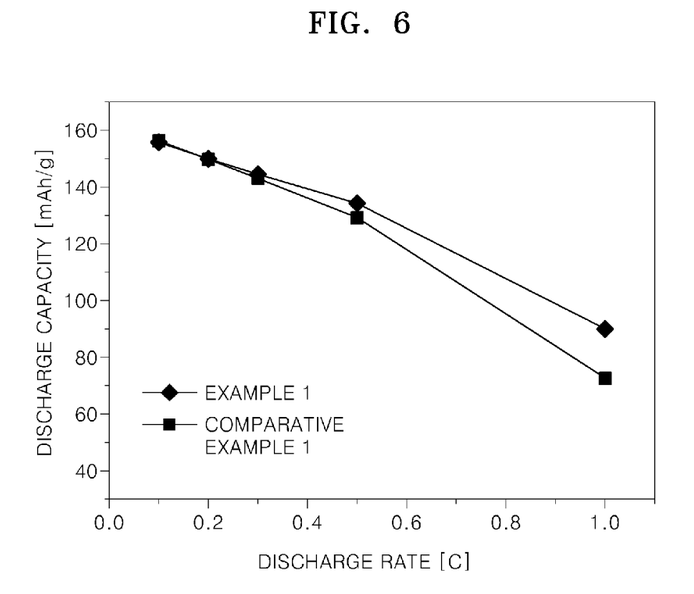
FIG. 6 is a graph of lifetime characteristics of coin cells manufactured according to Example 1 and Comparative Example 1.

Referring to FIG. 6, it is confirmed that at a high rate, the coin cell manufactured according to Example 1 showed substantially improved lifetime characteristics compared to the coin cell manufactured according to Comparative Example 2.

Evaluation Example 4

Electrode Mixture Swelling Ratio Test

A swelling ratio of the electrode mixture used in Example 1 was evaluated by using the following method. In this regard, the electrode mixture electrode is a mixture including a lithium iron phosphate ($LiFePO_4$) as an active material, acetylene black as a conducting agent, and the composite as a binder.

The swelling ratio value of the electrode mixture is shown in Table 1 below.

TABLE 1

| | Swelling ratio of electrode mixture (%) |
|---|---|
| Example 1 | 8 |

As described above, according to the one or more of the above embodiments, due to the inclusion of a composite in which a polymer is intercalated between layers of clay and thus chains of the polymer are not entangled, electrodes for a lithium secondary battery polymer swell less when an electrolytic solution permeates thereinto and thus, an increase in resistance thereof is prevented. Also, an active material and a conducting agent disperse well in the electrode and thus, performance of the electrode is improved.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A method of manufacturing an electrode for a lithium secondary battery, the method comprising:
   preparing a clay dispersion by dispersing clay having a layered structure with an interlayer distance of from about 1 to about 10 nm in a first solvent;
   preparing a composite by mixing the clay dispersion with a polymer or a polymer solution prepared by dissolving the polymer in a second solvent;
   wherein the composite comprises polymer intercalated between layers of the clay,
   preparing a composition for forming an electrode active material layer by adding an electrode active material to the composite and mixing the electrode active material and the composite; and
   coating and drying the composition on a current collector to form an electrode active material layer, wherein the polymer comprises at least one selected from the group consisting of polyvinylidene fluoride (PVDF), polyvinyl alcohol (PVA), and polyacrylic acid (PAA), wherein the clay dispersion is prepared at a temperature of about 40° C. to about 60° C.

2. The method of claim 1, wherein the amount of the polymer is from about 5 to about 2000 parts by weight based on 100 parts by weight of the clay.

3. The method of claim 1, wherein a conducting agent is further used in preparing the composition.

4. A lithium secondary battery comprising an electrode manufactured by the method of claim 1.

5. The method of claim 1, wherein the amount of the first solvent is from about 5000 to about 10000 parts by weight based on 100 parts by weight of the clay, and the amount of the second solvent may be from about 5000 to about 10000 parts by weight based on 100 parts by weight of the clay.

* * * * *